US012762748B2

(12) United States Patent
Sridhara et al.

(10) Patent No.: US 12,762,748 B2
(45) Date of Patent: Oct. 13, 2026

(54) DECORRELATION OF SPHERICAL HARMONIC COEFFICIENTS TOWARDS EFFICIENT COMPRESSION OF 3D GAUSSIAN SPLATS

(71) Applicants: SONY GROUP CORPORATION, Tokyo (JP); Sony Corporation of America, New York, NY (US)

(72) Inventors: Shashank Nelamangala Sridhara, Los Angeles, CA (US); Alexandre Zaghetto, San Jose, CA (US); Danillo Graziosi, Flagstaff, AZ (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 0 days.

(21) Appl. No.: 19/020,926

(22) Filed: Jan. 14, 2025

(65) Prior Publication Data

US 2026/0011036 A1 Jan. 8, 2026

Related U.S. Application Data

(60) Provisional application No. 63/667,685, filed on Jul. 3, 2024.

(51) Int. Cl.

| | |
|---|---|
| ***H04N 19/20*** | (2014.01) |
| ***G06T 9/00*** | (2006.01) |
| ***G06T 15/20*** | (2011.01) |
| ***H04N 9/67*** | (2023.01) |

(52) U.S. Cl.

CPC ................ *G06T 9/00* (2013.01); *G06T 15/20* (2013.01); *H04N 9/67* (2013.01); *H04N 19/20* (2014.11)

(58) Field of Classification Search

CPC ........... G06T 9/00; G06T 15/20; H04N 19/20; H04N 9/67

USPC ..................................................... 375/240.08

See application file for complete search history.

(56) References Cited

U.S. PATENT DOCUMENTS

| | | | | |
|---|---|---|---|---|
| 2003/0076334 | A1* | 4/2003 | Dumitras | G06T 11/10 375/E7.182 |
| 2013/0222645 | A1* | 8/2013 | Bilcu | H04N 19/154 382/233 |
| 2024/0355047 | A1* | 10/2024 | Supikov | G06T 17/00 |

FOREIGN PATENT DOCUMENTS

| | | |
|---|---|---|
| CN | 118172470 A | 6/2024 |
| CN | 118229860 A | 6/2024 |

OTHER PUBLICATIONS

Fan, Zhiwen, et al. "Lightgaussian: Unbounded 3d gaussian compression with 15x reduction and 200+ fps." arXiv preprint arXiv:2311.17245 (2023).

(Continued)

*Primary Examiner* — Nguyen T Truong

(74) *Attorney, Agent, or Firm* — Haverstock & Owens, A Law Corporation

(57) ABSTRACT

Techniques to handle the Spherical Harmonic (SH) coefficients associated with 3DGS towards effective compression are described herein. SH coefficients are used to represent view dependent RGB color values, which takes a significant amount of memory—48 out of 59 parameters per Gaussian. By applying suitable transformation to SH coefficients, the inter-channel redundancies are exploited, thereby effectively reducing the memory requirements by 50%.

21 Claims, 9 Drawing Sheets

(56) References Cited

OTHER PUBLICATIONS

Kerbl, Bernhard et al., "3D Gaussian Splatting for Real-Time Radiance Field Rendering." ACM Transactions on Graphics, 2023.
Panagiotis Papantonakis et al., Reducing the memory footprint of 3d gaussian splatting. Proceedings of the ACM on Computer Graphics and Interactive Techniques, 7(1):1-17, 2024.
Tong Wu, et al, "Recent advances in 3D Gaussian splatting", Computational Visual Media, https://doi.org/10.1007/s41095-024-0436-y, pp. 1-30.
Yu, Alex, et al. "Plenoxels: Radiance fields without neural networks." arXiv preprint arXiv:2112.05131 2.3 (2021): 6.
Sridhara Shashank N et al: "Decorrelation of Spherical Harmonic Coefficients towards Efficient Compression of 3DGS", 147. MPEG Meeting; Jul. 15, 2024-Jul. 19, 2024; Sapporo; (Motion Picture Expert Group or ISO/IEC JTC1/SC29/WG11), No. m69039, Jul. 11, 2024, XP030322761, Retrieved from the Internet: [retrieved on Jul. 11, 2024].
Sridhara Shashank N et al: "Point Cloud Attribute Compression Via Chroma Subsampling", ICASSP 2022—2022 IEEE International Conference on Acoustics, Speech and Signal Processing (ICASSP), IEEE, May 23, 2022, pp. 2579-2583, XP034158881, DOI: 10.1109/ICASSP43922.2022.9746352 [retrieved on Apr. 27, 2022].

* cited by examiner

| | $c_l^m(.)$ | |
|---|---|---|
| R | $DC_R$ | $+ 15\ SH_R$ |
| G | $DC_G$ | $+ 15\ SH_G$ |
| B | $DC_B$ | $+ 15\ SH_B$ |

700

$c_l^m(r), c_l^m(g), c_l^m(b)$

702

$\tilde{c}_l^m(y), \tilde{c}_l^m(u), \tilde{c}_l^m(v)$

DECORRELATION OF SPHERICAL HARMONIC COEFFICIENTS TOWARDS EFFICIENT COMPRESSION OF 3D GAUSSIAN SPLATS

CROSS-REFERENCE TO RELATED APPLICATION(S)

This application claims priority under 35 U.S.C. § 119(e) of the U.S. Provisional Patent Application Ser. No. 63/667,685, filed Jul. 3, 2024 and titled, "DECORRELATION OF SPHERICAL HARMONIC COEFFICIENTS TOWARDS EFFICIENT COMPRESSION OF 3D GAUSSIAN SPLATS," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

Point cloud compression is an important technology for handling large sets of 3D data points, which are used in various applications such as virtual reality (VR), augmented reality (AR), telecommunications, autonomous vehicles, and digital preservation of world heritage. The goal is to efficiently compress the vast amount of data in point clouds without significantly losing detail or accuracy.

The Moving Picture Experts Group (MPEG) has developed two main standards for point cloud compression: Geometry-based Point Cloud Compression (G-PCC) and Video-based Point Cloud Compression (V-PCC).

V-PCC leverages existing video compression technologies by projecting 3D point clouds onto 2D planes and encoding these projections as video streams. This approach is particularly advantageous for dynamic point clouds, such as those in real-time communication or interactive VR/AR environments.

G-PCC focuses on directly compressing the 3D geometric data of point clouds. G-PCC is particularly effective for static point clouds, such as those used in cultural heritage preservation, or sparse point clouds used for autonomous navigation.

G-PCC encodes point cloud data directly in 3D space, contrasting with the V-PCC that uses 3D to 2D projections. The method is highly effective for compressing sparse point clouds that do not translate well into 2D projections.

Currently, G-PCC standard primarily supports intra prediction, meaning it does not utilize temporal prediction tools that could improve compression efficiency for dynamic point clouds.

More recently, MPEG's activity towards a possible 2nd edition of G-PCC is extending it to dynamic point clouds with additional tools for inter-frame geometry and attribute coding.

SUMMARY OF THE INVENTION

Techniques to handle the Spherical Harmonic (SH) coefficients associated with 3DGS towards effective compression are described herein. SH coefficients are used to represent view dependent RGB color values, which takes a significant amount of memory—48 out of 59 parameters per Gaussian. By applying suitable transformation to SH coefficients, the inter-channel redundancies are exploited, thereby effectively reducing the memory requirements by 50%.

In one aspect, a method comprises applying a color space transform to Spherical Harmonic (SH) coefficients of a Gaussian splat, calculating view-dependent YUV components using the transformed SH coefficients and eliminating redundant SH coefficients. The method further comprises receiving the Gaussian splat. Receiving the Gaussian splat includes acquiring the Gaussian splat using one or more camera devices. Receiving the Gaussian splat includes receiving the Gaussian splat from another device. Eliminating the redundant SH coefficients includes retaining base colors, retaining the SH coefficients for the Luma (Y) component, but eliminating the SH coefficients for the Chroma (U and V) component. The Gaussian splat comprises geometry including position, scale and rotation, and attributes including the SH coefficients and opacity. Eliminating the redundant SH coefficients reduces memory requirements by approximately 50%.

In another aspect, an apparatus comprises a non-transitory memory for storing an application, the application for: applying a color space transform to Spherical Harmonic (SH) coefficients of a Gaussian splat, calculating view-dependent YUV components using the transformed SH coefficients and eliminating redundant SH coefficients and a processor coupled to the memory, the processor configured for processing the application. The application is further for receiving the Gaussian splat. Receiving the Gaussian splat includes acquiring the Gaussian splat using one or more camera devices. Receiving the Gaussian splat includes receiving the Gaussian splat from another device. Eliminating the redundant SH coefficients includes retaining base colors, retaining the SH coefficients for the Luma (Y) component, but eliminating the SH coefficients for the Chroma (U and V) component. The Gaussian splat comprises geometry including position, scale and rotation, and attributes including the SH coefficients and opacity. Eliminating the redundant SH coefficients reduces memory requirements by approximately 50%.

In another aspect, a system comprises a first device configured for acquiring the Gaussian splat and a second device configured for: receiving the Gaussian splat from the first device, applying a color space transform to Spherical Harmonic (SH) coefficients of a Gaussian splat, calculating view-dependent YUV components using the transformed SH coefficients and eliminating redundant SH coefficients. Acquiring the Gaussian splat includes using one or more camera devices. Eliminating the redundant SH coefficients includes retaining base colors, retaining the SH coefficients for the Luma (Y) component, but eliminating the SH coefficients for the Chroma (U and V) component. The Gaussian splat comprises geometry including position, scale and rotation, and attributes including the SH coefficients and opacity. Eliminating the redundant SH coefficients reduces memory requirements by approximately 50%.

Eliminating the redundant SH coefficients reduces 48 SH coefficients to 18 SH coefficients.

DETAILED DESCRIPTION OF THE PREFERRED EMBODIMENT

Figure 1:
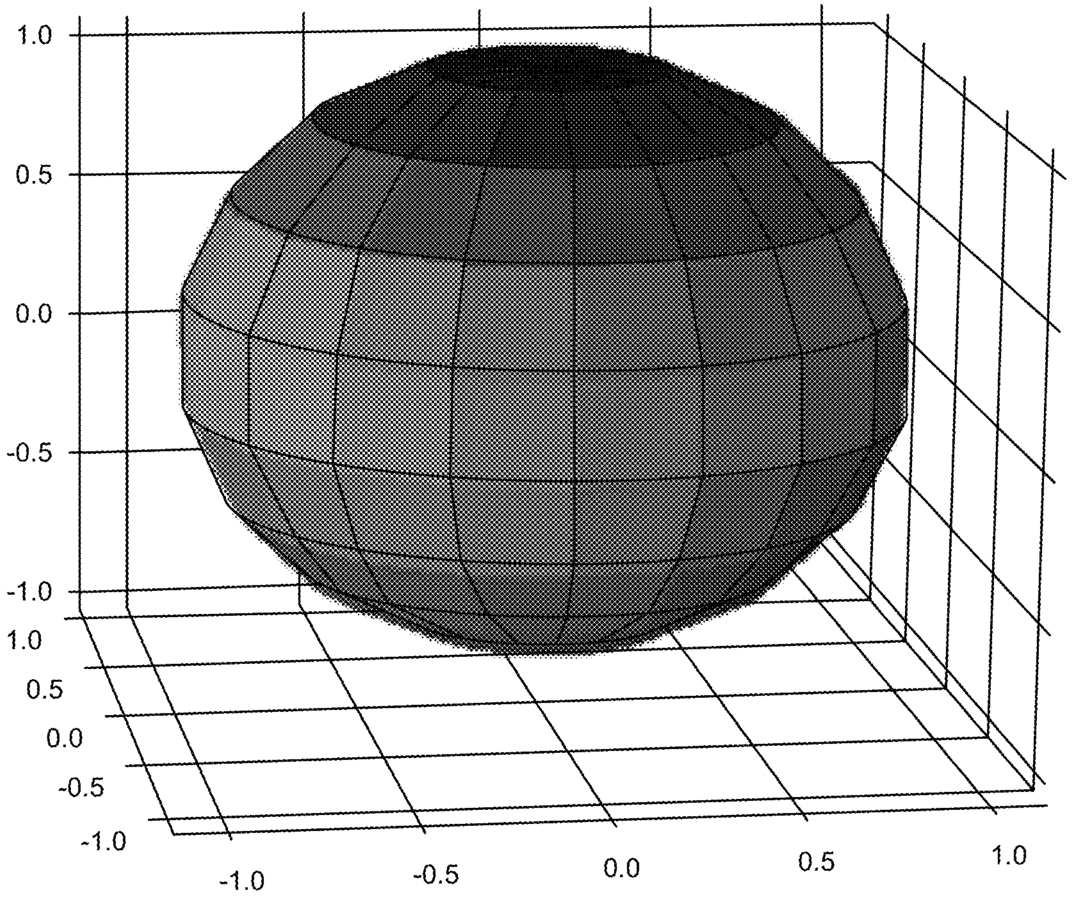
FIG. 1 illustrates view dependent RGB values reconstructed from SH coefficients according to some embodiments.

Techniques to handle the Spherical Harmonic (SH) coefficients associated with 3D Gaussian Splatting (3DGS) towards effective compression are described herein. SH coefficients represent view-dependent RGB color values, which take the highest memory—48 out of 59 parameters per Gaussian splat. By applying a suitable transformation to SH coefficients, the inter-channel redundancies can be exploited, thereby effectively reducing the memory requirements by approximately 50%. 3D Gaussian splatting (3DGS) has emerged as an efficient method for novel view synthesis from a sparse set of images. The scene represented by 3DGS can be rendered at high speed (>100 fps) compared to its precursors—NeRF, Plenoxels, and others. Due to faster training and high-quality rendering, 3DGS data is expected to grow significantly in the near future.

However, the optimized 3DGS includes millions of Gaussian primitives and uses gigabytes of memory to store. 3DGS includes the following parameters: positions, scale, rotation representing the geometry; and SH coefficients and opacities representing view-dependent color values, which can be considered as attributes. SH coefficients include 48 parameters to represent view-dependent RGB values with 16 coefficients for each of the 3 color channels.

Contrary to prior works, SH coefficients are analyzed from a signal processing perspective, and the inter-channel redundancies between the color channels are exploited by applying a suitable transformation directly on SH coefficients.

The transformation from RGB to YUV in video coding is an optional but often utilized process. This conversion is frequently used because it allows for more efficient compression and transmission of video data. The YUV color space separates luminance (Y) from chrominance (U and V), which aligns better with human vision. Humans are more sensitive to changes in brightness than to color differences. By converting to YUV, video codecs can allocate more bandwidth to the luminance component, reducing the resolution of the chrominance components without significantly affecting perceived image quality. This results in a more effective compression, enabling higher-quality video at lower bitrates.

Similarly, in point cloud compression standards, such as G-PCC and V-PCC, color space conversion from RGB to YUV is also possible. This conversion helps in efficiently compressing point cloud data by leveraging the same principles of human visual perception, ultimately improving compression performance, and reducing the required data bandwidth while maintaining visual fidelity.

In a recently studied Gaussian Splatting representation, a 3D scene is modeled in a similar way to point clouds, using 3D points with associated attributes. However, in contrast to point clouds, which represent color using sets of RGB values, Gaussian splats model color with a set of RGB values along with associated SH coefficients. This approach enables view-dependent rendering, allowing for more dynamic and realistic visualizations.

While the effect of applying color space conversion to sets of RGB values in video and point clouds is straightforward and well-known, the question of how to extend this same concept to Gaussian splats with SH coefficients and what the effects might be is not sufficiently explored. Described herein is how applying color space conversion to SH leads to compression gains while preserving the visual quality of the original Gaussian splat.

The results suggest that in scenarios where Gaussian splats are compressed, converting not only the RGB values but also the entire set of SH coefficients can be beneficial. Depending on the input Gaussian splat data, the properties observed in the spherical harmonics YUV domain can be efficiently exploited by existing point cloud compression schemes. It has been noticed that by applying a decorrelating transform on originally independent channels of SH coefficients, 30 out of 48 coefficients can be potentially eliminated, and the original splat is reconstructed with negligible subjective visual impact.

The qualitative and quantitative evaluation show that the described approach results in 50% memory reduction with negligible objective loss of PSNR/SSIM/LPIPS.

While RGB to YUV transformation is a common strategy to decorrelate color channels, other embodiments can apply any such decorrelating transform to SH coefficients.

In addition to the experiments performed, where the higher order coefficients corresponding to chroma channels are eliminated, a quantization strategy is employed to adaptively control the removal of the least relevant coefficients. For example, one can apply a different quantization strategy to each level or even to each individual SH coefficient of each color channel. Furthering the example, Quantizations Y0 to Y3, U0 to U3 and V0 to V3 can be used to independently quantize the coefficients of level 0 (DC) and the coefficients of levels 1 to 3 (higher order SH) of Y, U and V channels, respectively.

The RGB values for a given view direction ($\theta$, $\varphi$) can be obtained from the SH coefficients using the following equation, $$\text{color}_{rgb}(\theta,\Phi)=\begin{cases} R(\theta,\Phi)\approx\sum_{l=0}^{k}\sum_{m=-l}^{l}c_l^m(r)Z_l^m(\theta,\phi)\\ G(\theta,\Phi)\approx\sum_{l=0}^{k}\sum_{m=-l}^{l}c_l^m(g)Z_l^m(\theta,\phi)\\ B(\theta,\Phi)\approx\sum_{l=0}^{k}\sum_{m=-l}^{l}c_l^m(b)Z_l^m(\theta,\phi)\end{cases}$$

where, $$c_l^m(r),\ c_l^m(g),\ c_l^m(b)$$

are SH coefficients corresponding to red, green and blue channels, respectively, k is the order of the expansion, $$Z_l^m$$

(θ, φ) is the spherical harmonic function.

FIG. 1 illustrates view dependent RGB values reconstructed from SH coefficients according to some embodiments.

In classical signal processing, the RGB color values are transformed to YUV domain to decorrelate the color channels before applying transform coding (e.g., DCT). However, in 3DGS there are no longer scalar (R, G, B) values such as images/point clouds. Instead, there are view dependent [R(θ,Φ), G(θ,Φ), B(θ,Φ)] values. Since RGB values change based on viewing direction, applying a decorrelating transform is not as straightforward as in conventional image/point cloud compression. The decorrelating transform is applied such that, $$[Y(\theta, \Phi), U(\theta, \Phi), V(\theta, \Phi)]^T = M[R(\theta, \Phi), G(\theta, \Phi), B(\theta, \Phi)]^T$$

where, M is the transformation matrix. Since there is no prior information about (θ, Φ), the transform is not applied on the reconstructed RGB values.

The decorrelating transform is applied directly on the SH coefficients, which is translated to the original RGB to YUV transformation due to linear relation between SH coefficients and reconstructed RGB values, $$[\tilde{c}_1^m(y), \tilde{c}_1^m(u), \tilde{c}_1^m(v)]^T = M[c_1^m(r), c_1^m(g), c_1^m(b)]^T$$

where, $$\tilde{c}_l^m(y), \tilde{c}_l^m(u), \tilde{c}_l^m(v)$$

are transformed SH coefficients that correspond to Y, U and V-channels.

Figure 2:
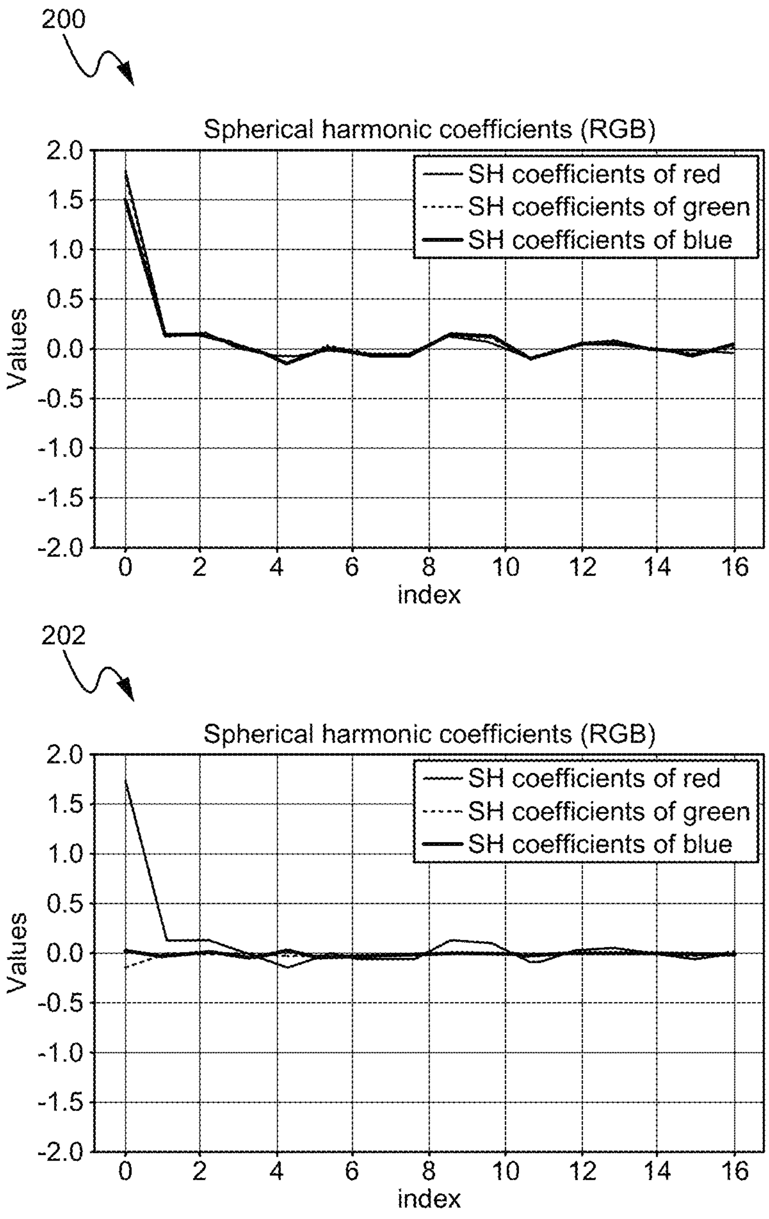
FIG. 2 illustrates graphs of the original coefficients and the transformed SH coefficients according to some embodiments.

FIG. 2 illustrates graphs of the original coefficients and the transformed SH coefficients according to some embodiments. In graph 200, the original SH coefficients are shown, and it can observed that the coefficients of RGB channels are correlated. The SH coefficients are in the RGB domain. In graph 202, the transformed SH coefficients are shown, and it can be observed that the coefficients are decorrelated. The SH coefficients are in the YUV domain.

Based on the plots in FIG. 2, redundancies in the higher-order SH coefficients (specifically in Chroma channels) are eliminated because most of the signal energy is concentrated in Luma channel. Due to perceptual masking, it is possible to reduce the coefficients with minimal or no impact.

Figure 3:
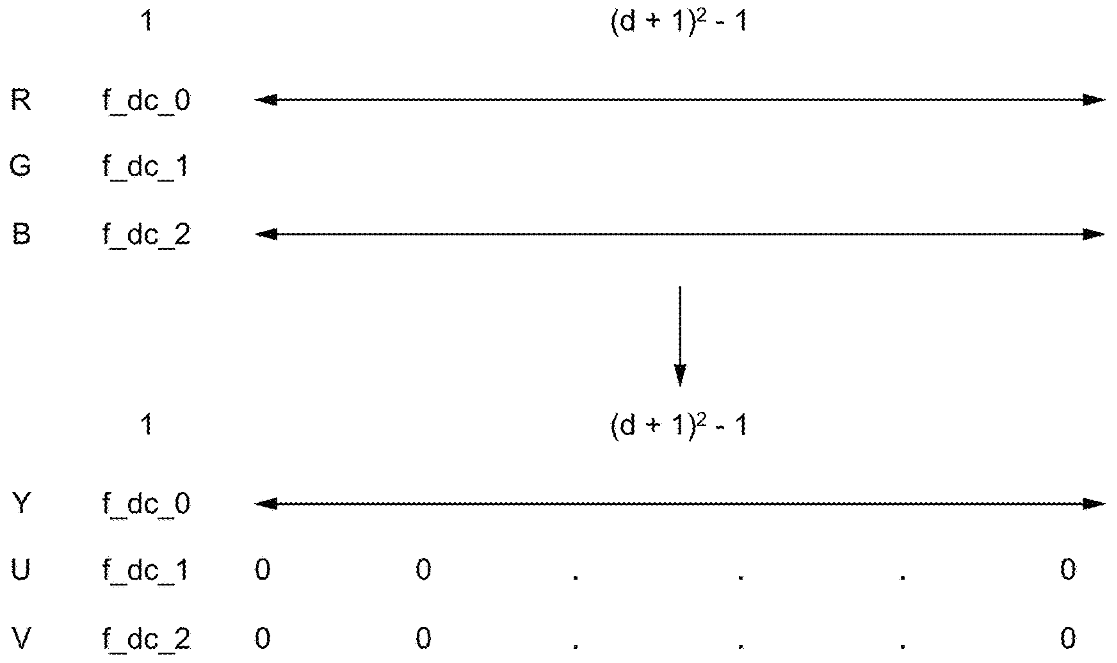
FIG. 3 illustrates a scheme of eliminating redundancies in the higher-order SH coefficients according to some embodiments.

FIG. 3 illustrates a scheme of eliminating redundancies in the higher-order SH coefficients according to some embodiments. In addition to the scheme, where the higher order coefficients corresponding to chroma channels are completely eliminated, a quantization strategy is employed to adaptively control the removal of the least relevant coefficients.

While RGB to YUV transformation is a common strategy to decorrelate color channels, any such decorrelating transform is able to be applied to the SH coefficients.

Figure 4:
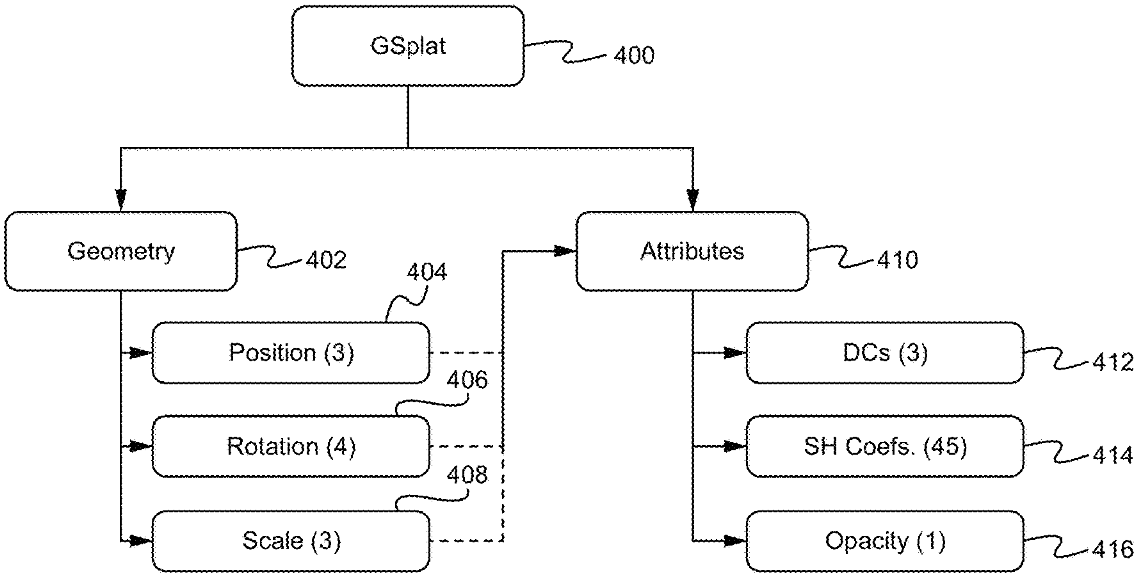
FIG. 4 illustrates a diagram of the 3DGS structure according to some embodiments.

FIG. 4 illustrates a diagram of the 3DGS structure according to some embodiments. The 3DGS structure 400 is similar to a point cloud but with many more attributes. Some attribute information is able to be removed from the 3DGS structure 400. The 3DGS structure 400 is a data format that describes the geometry 402 and texture/attributes 410 of a scene that is able to be rendered in 3D. The geometry parameters describe the 3D Gaussian in space. For each point, there is the position of the Gaussian, the orientation of the Gaussian, and the scale of the Gaussian in the three dimensional space. The geometry 402 includes position 404, rotation 406 and scale 408. The position 402 is able to include (x, y, z) components. There are four rotation parameters 406 and three scale parameters 408. In some embodiments, each position includes attribute information such as DCs 412, Spherical Harmonics (SH) coefficients 414 and opacity 416. The DCs 412 represent the base color of each point. The SH coefficients 414 allow for rendering different colors depending on the point of view direction. For example, the base color is able to be modified using the SH coefficients 414.

Figure 5:
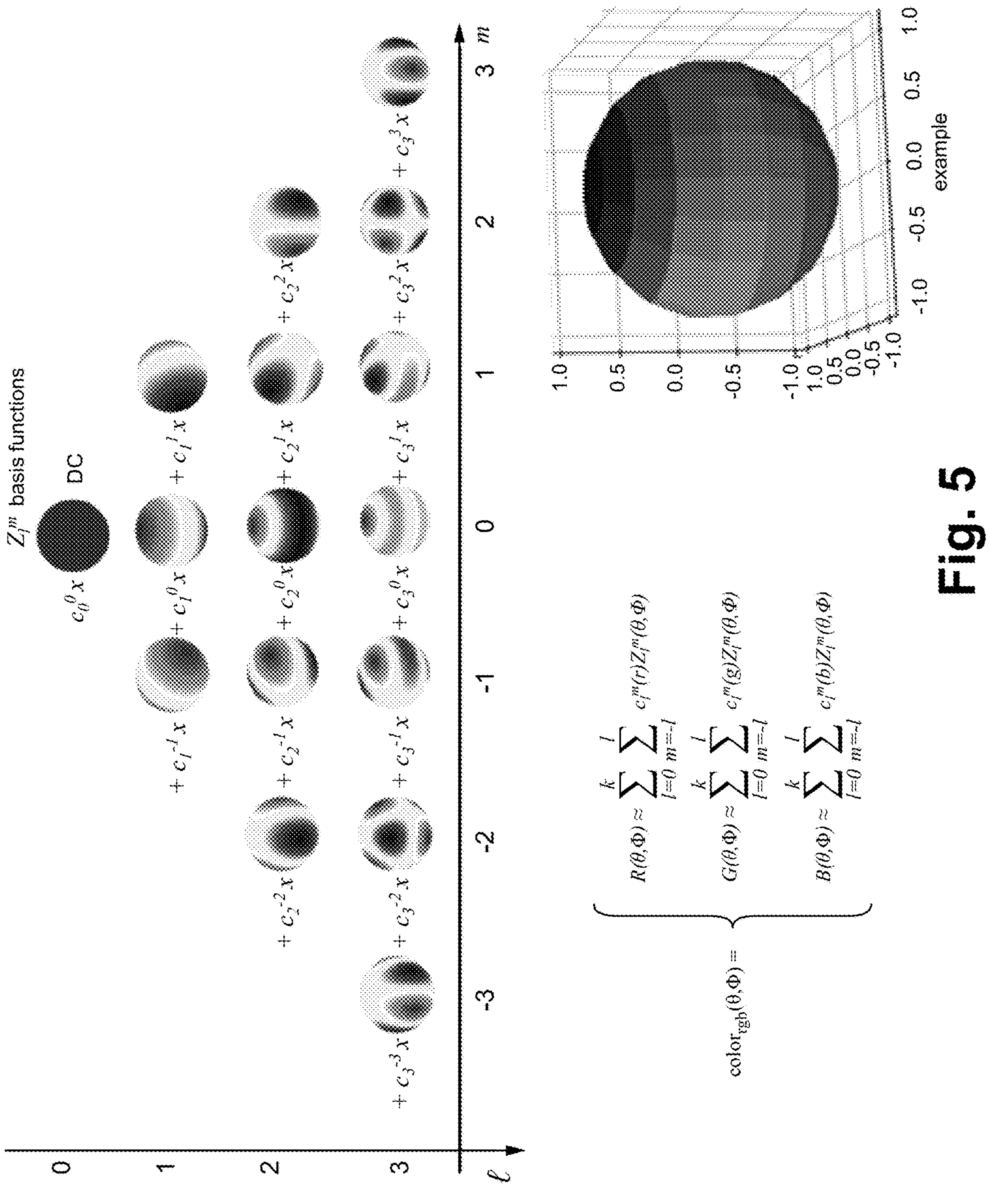
FIG. 5 illustrates view-dependent effects of the SH coefficients according to some embodiments.

FIG. 5 illustrates view-dependent effects of the SH coefficients according to some embodiments. The SH coefficients are basis functions which cause a different appearance depending on the view direction. The DC and higher-order spherical harmonic (SH) coefficients are multiplied by their respective basis functions and summed to produce the view-dependent effects. There are able to be different levels of functions, and with more levels, more details or different view directions are able to be generated. For each color component (R, G, B), a weighted average is able to be applied. Then, depending on the view direction, a new value for each color component is determined. Although an exemplary sphere is shown, another shape is able to be utilized such as an ellipsoid.

Figure 6:
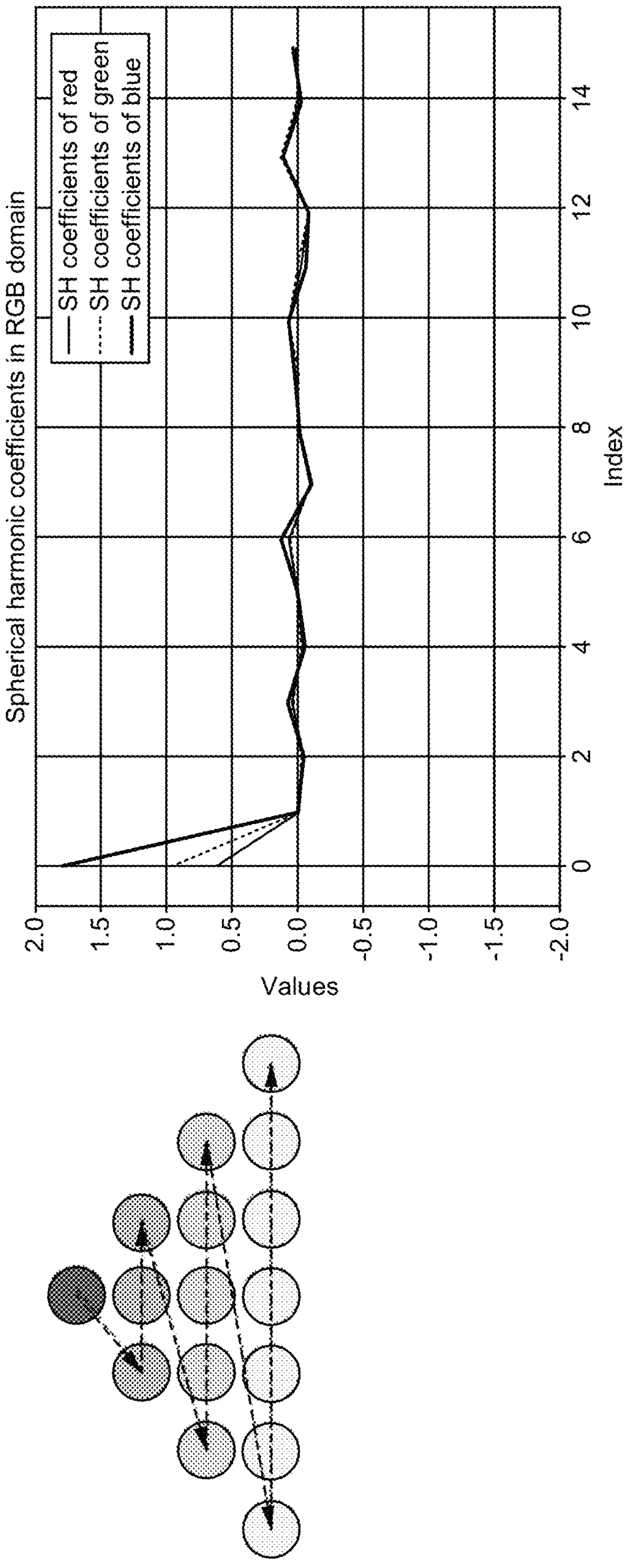
FIG. 6 illustrates a diagram and graph of redundancy among SH channels according to some embodiments.

FIG. 6 illustrates a diagram and graph of redundancy among SH channels according to some embodiments. It is determined if there is redundant or irrelevant information (in terms of rendering quality) contained in the base color or SH. By removing some of the coefficients, it is possible to still have high quality view-dependent rendering without significant degradation. A color space conversion (RGB to YUV) is applied to the SH coefficients. As shown in the graph, the SH coefficients of each channel are highly correlated.

A decorrelating transform M is applied, such that:

$$[Y(\theta, \Phi), U(\theta, \Phi), V(\theta, \Phi)]^T = M[R(\theta, \Phi), G(\theta, \Phi), B(\theta, \Phi)]^T.$$

Generating many red, green, and blue data sets for each point and then transforming all of this data into view-dependent YUV is not practicable. Instead of applying the color space transformation to the color itself, the RGB-to-YUV color space transformation is applied to the SH coefficients.

$$[\tilde{c}_l^m(y), \tilde{c}_l^m(u), \tilde{c}_l^m(v)]^T = M[c_l^m(r), c_l^m(g), c_l^m(b)]^T.$$

By transforming the SH coefficients, there are only 15 values per color to transform. The transformed SH coefficients represent YUV spherical harmonics.

Once obtained, the transformed SH coefficients can be used to calculate the view-dependent YUV components.

$$[\tilde{c}_l^m(y), \tilde{c}_l^m(u), \tilde{c}_l^m(v)]^T = M[c_l^m(r), c_l^m(g), c_l^m(b)]^T$$

$$\text{color}_{yuv}(\theta, \Phi) = \begin{cases} Y(\theta, \Phi) \approx \sum_{l=0}^{k} \sum_{m=-l}^{l} \tilde{c}_l^m(y) Z_l^m(\theta, \phi) \\ U(\theta, \Phi) \approx \sum_{l=0}^{k} \sum_{m=-l}^{l} \tilde{c}_l^m(u) Z_l^m(\theta, \phi) \\ V(\theta, \Phi) \approx \sum_{l=0}^{k} \sum_{m=-l}^{l} \tilde{c}_l^m(v) Z_l^m(\theta, \phi) \end{cases}$$

Figure 7:
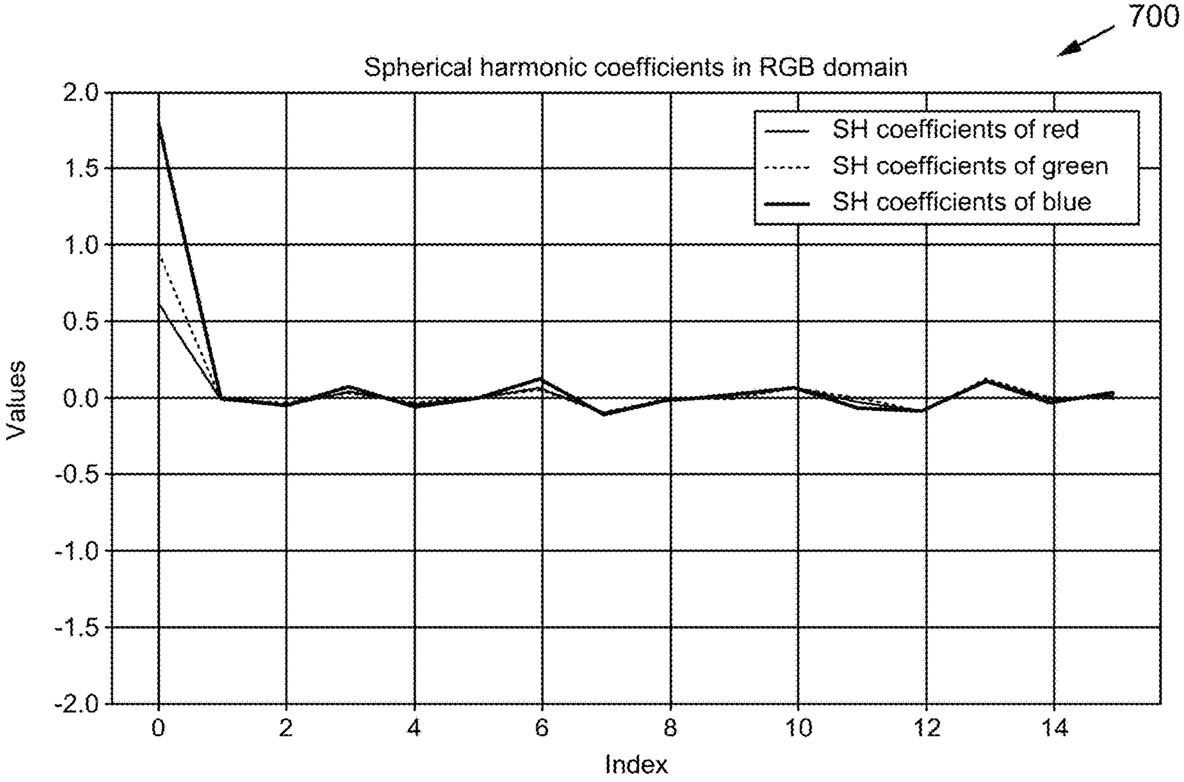
FIG. 7 illustrates graphs of the SH coefficients in the RGB domain and YUV domain according to some embodiments.
Figure 7:
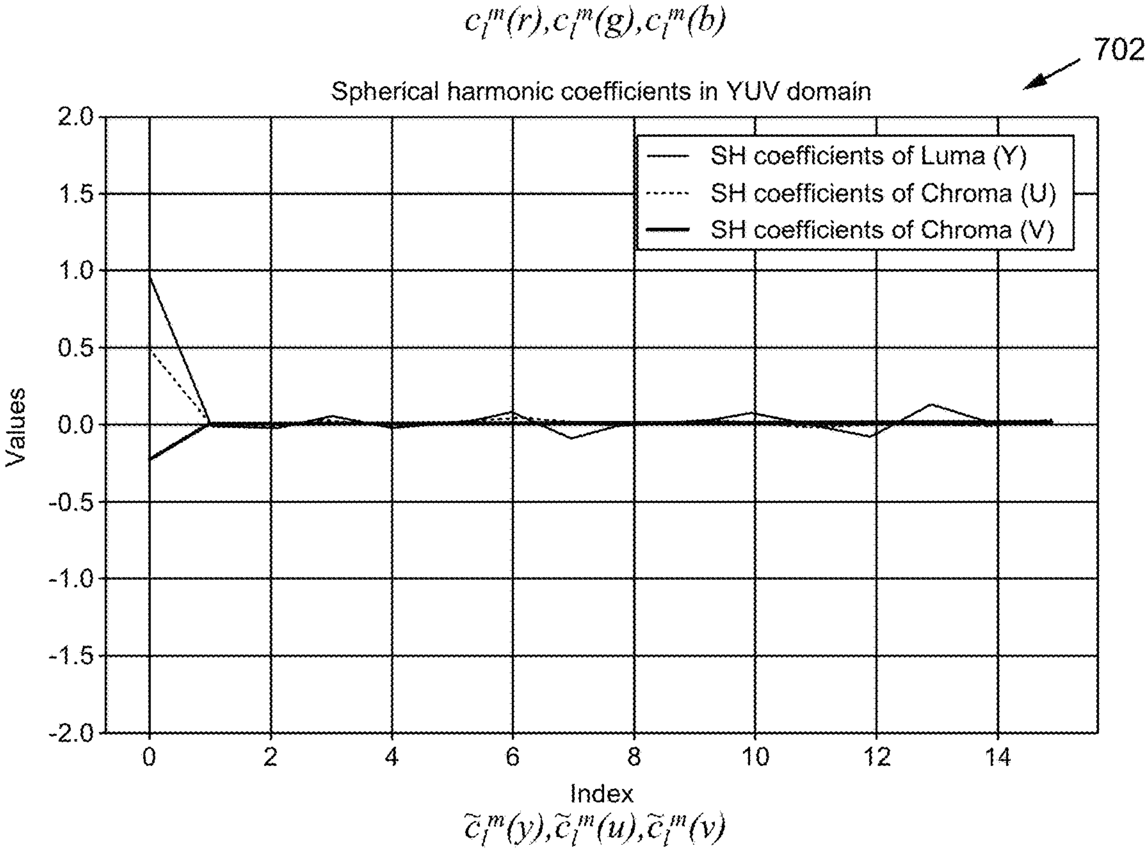

FIG. 7 illustrates graphs of the SH coefficients in the RGB domain and YUV domain according to some embodiments. The graph 700 is of the SH coefficients in the RGB domain. The graph 702 is of the SH coefficients in the YUV domain. The graph 702 shows that the Y component (Luma) is the strongest signal, so the chroma components (U and V) are able to be eliminated.

Figure 8:
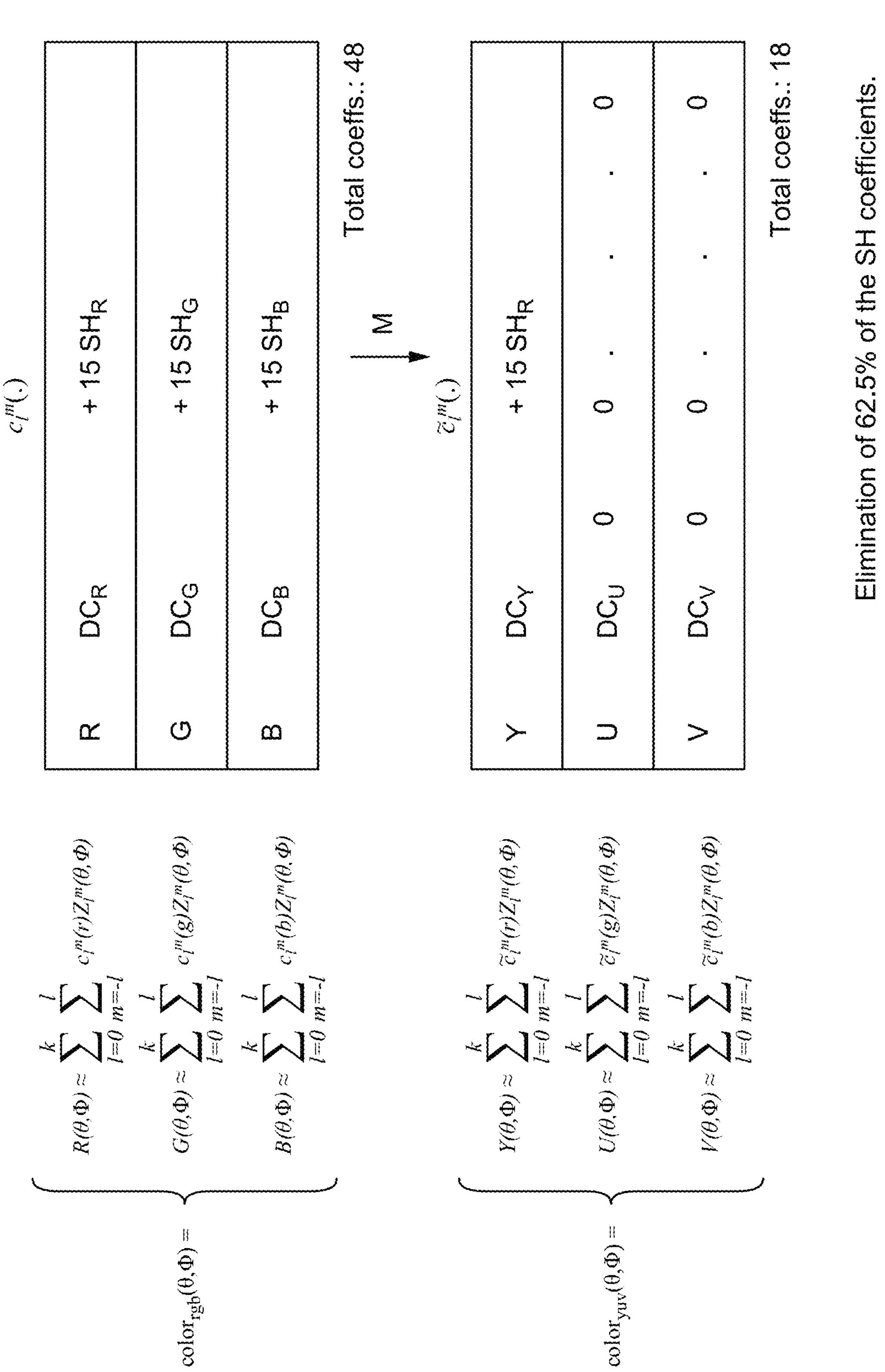
FIG. 8 illustrates a diagram of the elimination of redundant SH coefficients according to some embodiments.

FIG. 8 illustrates a diagram of the elimination of redundant SH coefficients according to some embodiments. As described, originally the colors are RGB, and a color space transform is applied to the SH coefficients to generate the SH coefficients in the YUV domain. Then, the base color Y, U and V are retained, and the SH coefficients for the Y component are used, but the SH coefficients for the U and V components are set to zero. This reduces the number of coefficients from 48 to 18.

Additionally, the inverse is able to be performed at the decoder. The U and V SH coefficients will still be zeroes, and the Y would utilize the inverse transformation from the YUV color space to the RGB color space.

Figure 9:
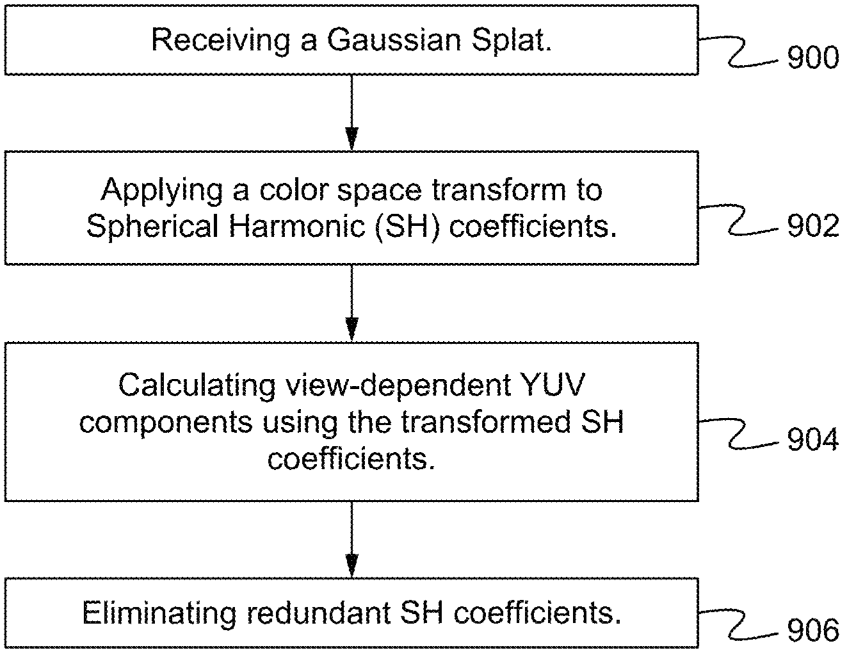
FIG. 9 illustrates a flowchart of a method of decorrelation according to some embodiments.

FIG. 9 illustrates a flowchart of a method of decorrelation according to some embodiments. In the step 900, a Gaussian splat is received. The Gaussian splat is able to be received in any manner such as being acquired using one or more camera devices or received from another device. In the step 902, a color space transform is applied to spherical harmonic coefficients of the Gaussian splat. In the step 904, view-dependent YUV components are calculated using the transformed SH coefficients. In the step 906, redundant SH coefficients are eliminated. For example, the base colors are retained, and the SH coefficients for the Luma (Y) component are retained, but the SH coefficients for the Chroma (U and V) component are eliminated. In some embodiments, the order of the steps are modified. In some embodiments, fewer or additional steps are implemented.

Figure 10:
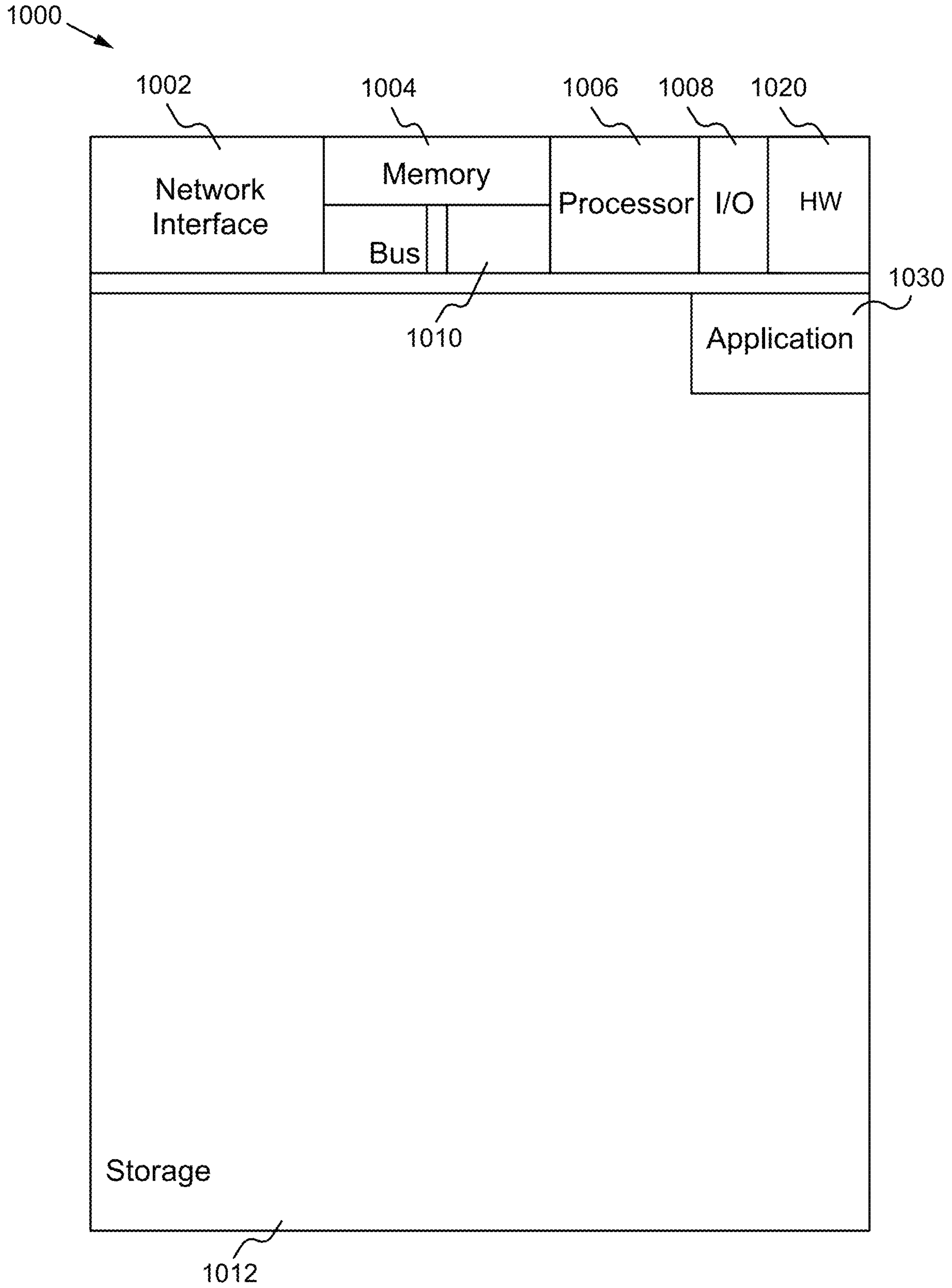
FIG. 10 shows a block diagram of an exemplary computing device configured to implement the decorrelation method according to some embodiments.

FIG. 10 shows a block diagram of an exemplary computing device configured to implement the decorrelation method according to some embodiments. The computing device 1000 is able to be used to acquire, store, compute, process, communicate and/or display information such as images and videos. The computing device 1000 is able to implement any of the decorrelation method aspects. In general, a hardware structure suitable for implementing the computing device 1000 includes a network interface 1002, a memory 1004, a processor 1006, I/O device(s) 1008, a bus 1010 and a storage device 1012. The choice of processor is not critical as long as a suitable processor with sufficient speed is chosen. The memory 1004 is able to be any conventional computer memory known in the art. The storage device 1012 is able to include a hard drive, CDROM, CDRW, DVD, DVDRW, High Definition disc/drive, ultra-HD drive, flash memory card or any other storage device. The computing device 1000 is able to include one or more network interfaces 1002. An example of a network interface includes a network card connected to an Ethernet or other type of LAN. The I/O device(s) 1008 are able to include one or more of the following: keyboard, mouse, monitor, screen, printer, modem, touchscreen, button interface and other devices. Decorrelation application(s) 1030 used to implement the decorrelation method are likely to be stored in the storage device 1012 and memory 1004 and processed as applications are typically processed. More or fewer components shown in FIG. 10 are able to be included in the computing device 1000. In some embodiments, decorrelation hardware 1020 is included. Although the computing device 1000 in FIG. 10 includes applications 1030 and hardware 1020 for the decorrelation method, the decorrelation method is able to be implemented on a computing device in hardware, firmware, software or any combination thereof. For example, in some embodiments, the decorrelation method applications 1030 are programmed in a memory and executed using a processor. In another example, in some embodiments, the decorrelation method hardware 1020 is programmed hardware logic including gates specifically designed to implement the decorrelation method.

In some embodiments, the decorrelation application(s) 1030 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the decorrelation method described herein, a device such as a camera is used to acquire 3D content, and a device is able to process the acquired content. The decorrelation method is able to be implemented with user assistance or automatically without user involvement.

In operation, the decorrelation method handles SH coefficients in 3DGS by directly transforming the SH coefficients from the RGB to YUV domain. Due to perceptual masking, it is possible to eliminate redundant coefficients with minimal or no impact of perceptual quality. Empirical results on three widely used datasets show that the method effectively reduces 50% storage without significant impact on PSNR/SSIM/LPIPS.

Additionally, the higher order coefficients (both luma and chroma) are able to be quantized adaptively based on the order/degree of the coefficient. The approach reduce the memory effectively based on the importance of the higher-order coefficients.

Some Embodiments of Decorrelation of Spherical Harmonic Coefficients Towards Efficient Compression of 3D Gaussian Splats 1. A method comprising:

applying a color space transform to Spherical Harmonic (SH) coefficients of a Gaussian splat;
calculating view-dependent YUV components using the transformed SH coefficients; and
eliminating redundant SH coefficients.
2. The method of clause 1 further comprising receiving the Gaussian splat.
3. The method of clause 2 wherein receiving the Gaussian splat includes acquiring the Gaussian splat using one or more camera devices.
4. The method of clause 2 wherein receiving the Gaussian splat includes receiving the Gaussian splat from another device.
5. The method of clause 1 wherein eliminating the redundant SH coefficients includes retaining base colors, retaining the SH coefficients for the Luma (Y) component, but eliminating the SH coefficients for the Chroma (U and V) component.
6. The method of clause 1 wherein the Gaussian splat comprises geometry including position, scale and rotation, and attributes including the SH coefficients and opacity.
7. The method of clause 1 wherein eliminating the redundant SH coefficients reduces memory requirements by approximately 50%.
8. An apparatus comprising:
a non-transitory memory for storing an application, the application for:
applying a color space transform to Spherical Harmonic (SH) coefficients of a Gaussian splat;
calculating view-dependent YUV components using the transformed SH coefficients; and
eliminating redundant SH coefficients; and
a processor coupled to the memory, the processor configured for processing the application.
9. The apparatus of clause 8 wherein the application is further for receiving the Gaussian splat.
10. The apparatus of clause 9 wherein receiving the Gaussian splat includes acquiring the Gaussian splat using one or more camera devices.
11. The apparatus of clause 9 wherein receiving the Gaussian splat includes receiving the Gaussian splat from another device.
12. The apparatus of clause 8 wherein eliminating the redundant SH coefficients includes retaining base colors, retaining the SH coefficients for the Luma (Y) component, but eliminating the SH coefficients for the Chroma (U and V) component.
13. The apparatus of clause 8 wherein the Gaussian splat comprises geometry including position, scale and rotation, and attributes including the SH coefficients and opacity.
14. The apparatus of clause 8 wherein eliminating the redundant SH coefficients reduces memory requirements by approximately 50%.
15. A system comprising:
a first device configured for acquiring the Gaussian splat; and
a second device configured for:
receiving the Gaussian splat from the first device;
applying a color space transform to Spherical Harmonic (SH) coefficients of a Gaussian splat;
calculating view-dependent YUV components using the transformed SH coefficients; and
eliminating redundant SH coefficients.
16. The system of clause 15 wherein acquiring the Gaussian splat includes using one or more camera devices.
17. The system of clause 15 wherein eliminating the redundant SH coefficients includes retaining base colors, retaining the SH coefficients for the Luma (Y) component, but eliminating the SH coefficients for the Chroma (U and V) component.
18. The system of clause 15 wherein the Gaussian splat comprises geometry including position, scale and rotation, and attributes including the SH coefficients and opacity.
19. The system of clause 15 wherein eliminating the redundant SH coefficients reduces memory requirements by approximately 50%.
20. The system of clause 15 wherein eliminating the redundant SH coefficients reduces 48 SH coefficients to 18 SH coefficients.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method comprising:
applying a color space transform to Spherical Harmonic (SH) coefficients of a Gaussian splat;
calculating view-dependent YUV components using the transformed SH coefficients; and
eliminating redundant SH coefficients, wherein eliminating the redundant SH coefficients includes retaining base colors, retaining the SH coefficients for the Luma (Y) component, but eliminating the SH coefficients for the Chroma (U and V) component.

2. The method of claim 1 further comprising receiving the Gaussian splat.

3. The method of claim 2 wherein receiving the Gaussian splat includes acquiring the Gaussian splat using one or more camera devices.

4. The method of claim 2 wherein receiving the Gaussian splat includes receiving the Gaussian splat from another device.

5. The method of claim 1 wherein the Gaussian splat comprises geometry including position, scale and rotation, and attributes including the SH coefficients and opacity.

6. The method of claim 1 wherein eliminating the redundant SH coefficients reduces memory requirements by approximately 50%.

7. An apparatus comprising:
a non-transitory memory for storing an application, the application for:
applying a color space transform to Spherical Harmonic (SH) coefficients of a Gaussian splat;
calculating view-dependent YUV components using the transformed SH coefficients; and
eliminating redundant SH coefficients, wherein eliminating the redundant SH coefficients includes retaining base colors, retaining the SH coefficients for the Luma (Y) component, but eliminating the SH coefficients for the Chroma (U and V) component; and
a processor coupled to the memory, the processor configured for processing the application.

8. The apparatus of claim 7 wherein the application is further for receiving the Gaussian splat.

9. The apparatus of claim 8 wherein receiving the Gaussian splat includes acquiring the Gaussian splat using one or more camera devices.

10. The apparatus of claim 8 wherein receiving the Gaussian splat includes receiving the Gaussian splat from another device.

11. The apparatus of claim 7 wherein the Gaussian splat comprises geometry including position, scale and rotation, and attributes including the SH coefficients and opacity.

12. The apparatus of claim 7 wherein eliminating the redundant SH coefficients reduces memory requirements by approximately 50%.

13. A system comprising:

a first device configured for acquiring the Gaussian splat; and a second device configured for:

receiving the Gaussian splat from the first device;

applying a color space transform to Spherical Harmonic (SH) coefficients of a Gaussian splat;

calculating view-dependent YUV components using the transformed SH coefficients; and eliminating redundant SH coefficients, wherein eliminating the redundant SH coefficients includes retaining base colors, retaining the SH coefficients for the Luma (Y) component, but eliminating the SH coefficients for the Chroma (U and V) component.

14. The system of claim 13 wherein acquiring the Gaussian splat includes using one or more camera devices.

15. The system of claim 13 wherein the Gaussian splat comprises geometry including position, scale and rotation, and attributes including the SH coefficients and opacity.

16. The system of claim 13 wherein eliminating the redundant SH coefficients reduces memory requirements by approximately 50%.

17. The system of claim 13 wherein eliminating the redundant SH coefficients reduces 48 SH coefficients to 18 SH coefficients.

18. A system comprising:

a first device configured for acquiring the Gaussian splat; and a second device configured for:

receiving the Gaussian splat from the first device;

applying a color space transform to Spherical Harmonic (SH) coefficients of a Gaussian splat;

calculating view-dependent YUV components using the transformed SH coefficients; and eliminating redundant SH coefficients, wherein eliminating the redundant SH coefficients reduces 48 SH coefficients to 18 SH coefficients.

19. The system of claim 18 wherein acquiring the Gaussian splat includes using one or more camera devices.

20. The system of claim 18 wherein the Gaussian splat comprises geometry including position, scale and rotation, and attributes including the SH coefficients and opacity.

21. The system of claim 18 wherein eliminating the redundant SH coefficients reduces memory requirements by approximately 50%.

* * * * *